P. BORN.

FOLDING-CHAIR.

No. 6,815. Reissued Dec. 21, 1875.

Witnesses

Chas. H. Smith

Harold Serrell

Inventor

Peter Born.

Lemuel W. Serrell

UNITED STATES PATENT OFFICE

PETER BORN, OF NEW YORK, N. Y., ASSIGNOR, BY MESNE ASSIGNMENTS, TO EDWARD W. VAILL.

IMPROVEMENT IN FOLDING CHAIRS.

Specification forming part of Letters Patent No. 82,791, dated October 6, 1868; reissue No. 6,815, dated December 21, 1875; application filed October 25, 1875.

*To all whom it may concern:*

Be it known that I, PETER BORN, of the city and State of New York, have invented an Improvement in Folding Chairs, of which the following is a specification:

Folding chairs have been made with the front legs extended up to and connected with the back, as may be seen in English Patent No. 3,029, of 1862; but the back legs were hinged to the front legs, and the back received its principal support from prolongations of the front legs; and the back and back legs of a folding chair have been made in one frame, as in English Patent No. 642, of 1853, and United States Patent No. 40,526, to A. D. Whitemore, November 3, 1863.

My invention relates to a folding chair in which the back and back legs are in one frame, and combined with the front legs that extend above the seat and are hinged to the back.

Figure 1:
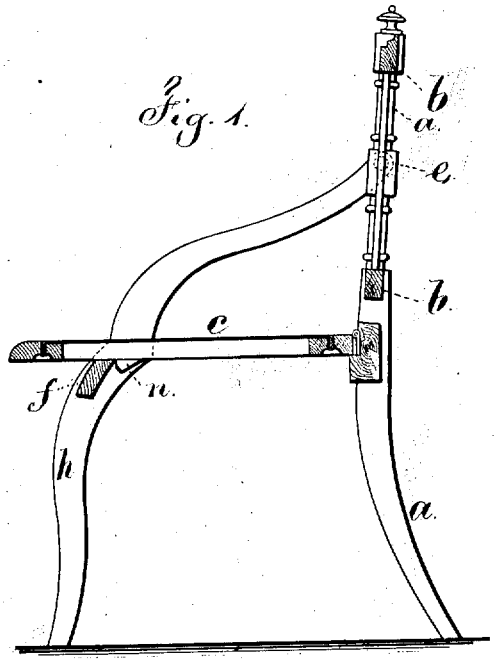
Figure 3:
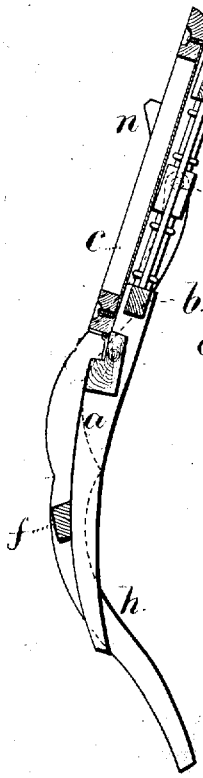
Figure 2:
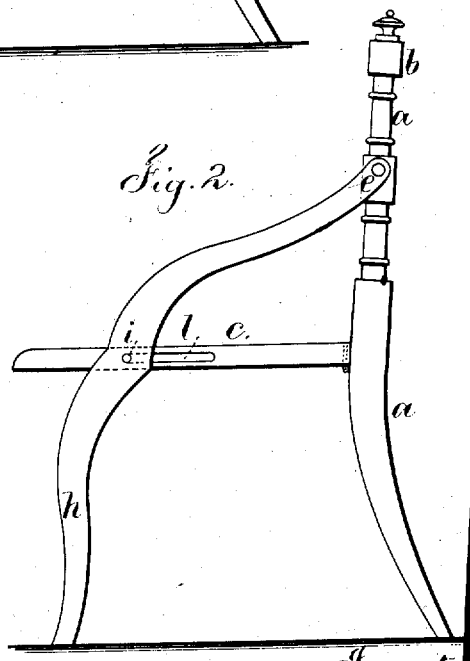

In the drawing, Figure 1 is a vertical section of the chair as opened for use. Fig. 2 is a side elevation, and Fig. 3 represents the chair as folded for transportation.

The back frame is made of side pieces *a*, forming, also, the back legs and cross-pieces or other connections *b*, forming the back of the chair. The seat or seat-frame *c* is of any suitable character as to size or shape, so as to adapt it to the other parts of the chair. This seat *c* is hinged at the back, so as to swing up, as in Fig. 1, or down, as in Fig. 2, as the chair is folded for transportation. The front legs *h* are connected to the back frame at their upper ends, and serve as both legs and arm-pieces, because the connection at *e* is above the seat *c*, and the front legs are shown as connected together by the cross-piece *f*, that serves also as a support for the front part of the seat, and stops that are shown at *n*, Figs. 1 and 3, upon the seat, serve to render the chair firm when unfolded for use. The slots at *l* and pins at *i* serve to connect the seat and legs, and to support the seat when in use, and as stops to limit the movement of the front legs *h* when the chair is in use. The slots *l* in the seat-frame and the pins *i* in the legs, as shown in Fig. 2, allow the seat to turn downwardly as the chair is closed, the hinges at the back being placed so as to allow of this movement.

When the chair is folded it occupies but little space, and when unfolded for use it is very firm, and it has not the objectionable appearance of many of the folding chairs before in existence.

I claim as my invention—

1. In a folding chair, the back and back legs forming one frame, in combination with the front legs extended above the seat and pivoted to the back, substantially as set forth.

2. The back and back legs forming one frame, a folding-seat frame, and front legs connected at their upper ends to the back frame, in combination with stops to hold the seat and front legs in position, when unfolded for use, substantially as set forth.

3. In a folding chair, a back and back legs in one frame, and front legs extending above the seat or seat-frame, and pivoted to the back, in combination with a folding seat and a cross-bar between the front legs that support the seat, substantially as set forth.

4. The combination, with the back legs and back of a folding chair forming one frame, and the front-leg frame connected at its upper end to the back frame, of a seat-frame hinged to the back and folding downwardly, and supports upon the front legs for the seat and for limiting the forward movement of the front legs when in use, substantially as set forth.

5. In a folding chair, the front legs extending upwardly above the seat and forming arm-pieces that are hinged directly to the back frame, substantially as set forth.

Signed by me this 22d day of September, A. D. 1875.

PETER BORN.

Witnesses:
HARROLD SERRELL,
GEO. D. WALKER.